United States Patent [19]

Fulks

[11] Patent Number: 5,720,531

[45] Date of Patent: Feb. 24, 1998

[54] VARIABLE PITCH SCREW DRIVER FOR USE IN A BRAKE SYSTEM

[75] Inventor: Gary Chris Fulks, Spring Valley, Ohio

[73] Assignee: General Motors Corporation, Detroit, Mich.

[21] Appl. No.: 761,919

[22] Filed: Dec. 9, 1996

[51] Int. Cl.[6] ........................................ B60T 8/11
[52] U.S. Cl. ............................ 303/115.2; 74/424.8 B
[58] Field of Search ................... 303/115.2; 74/424.8 B

[56] References Cited

U.S. PATENT DOCUMENTS

| | | | |
|---|---|---|---|
| 3,549,210 | 12/1970 | Birge et al. | 303/115.2 |
| 4,653,815 | 3/1987 | Agarwal et al. | 303/115.2 |
| 5,069,081 | 12/1991 | Morita | 74/424.8 B |
| 5,303,604 | 4/1994 | Mayfield | 74/424.88 |
| 5,433,514 | 7/1995 | Tsukamoto et al. | 303/115.2 |

*Primary Examiner*—Matthew C. Graham
*Attorney, Agent, or Firm*—Jeffrey A. Sedlar

[57] ABSTRACT

A variable pitch screw driver system includes a rotatable drive nut powered by a motor actuator. A base screw having a fixed pitch extends through the drive nut and is linearly translatable in response to rotation of the drive nut. The base screw carries a pin that follows a secondary helical screw. Linear translation of the base screw is altered by tracking of the pin along the helical screw such that rotation of the base screw is selectively effected simultaneously with rotation of the drive nut resulting in an effective variable pitch of the screw driver. Linear translation of the base screw effects linear translation of a piston at a variable rate.

6 Claims, 3 Drawing Sheets

VARIABLE PITCH SCREW DRIVER FOR USE IN A BRAKE SYSTEM

TECHNICAL FIELD

The present invention relates to a variable pitch screw driver and more particularly, to a variable pitch screw driven pressure modulation system.

BACKGROUND OF THE INVENTION

Screw driven systems for effecting a deskable pressure change in a braking system are well known devices. U.S. Pat. No. 4,653,815 which issued Mar. 31, 1987 describes one such device. In this type of system, a motor driven screw effects translation of a piston that in-turn, results in a corresponding increase or decrease in fluid pressure contained within a closed braking circuit. In using such a conventional screw driven system for effecting brake pressure modulation in wheel brake applications or releases, resulting system pressure gradients are important. A significant amount of development has concentrated on provided a motor actuator that operates to enable generation of the pressure and response times required while meeting energy limitation requirements using the now conventional screw-driven technology.

Such motor actuated screw driven systems have proven particularly successful for use in the application and release of fluid pressure in braking systems. At times, the system within which the screw driver is used is required to operate with faster response times. Faster response times require a motor actuator that is more powerful and uses an additional amount of energy to operate. This leads to an increase in cost. Accordingly, improvements in screw-driven systems generally, and for use in vehicle braking systems in particular, would benefit from potential improvements resulting in possibly lower energy consumption requirements when increasing translation speeds.

SUMMARY OF THE INVENTION

In the pressurization of a braking system during full braking cycles, it has been found that the actual forces required of the screw driver are variable. During initial braking system pressurization, low forces are encountered as brake pads begin to contact their corresponding rotor or shoe and as compliance of hoses in the braking lines is accounted for. During this period of brake application, high fluid flow conditions under relatively low pressures are encountered. For example, in a selected system it may be preferable to displace 0.07 cubic inches of brake fluid while generating 200 pounds per square inch during the initial actuation period. This equates to an average pressure increase of 28.57 psi/0.01 cubic inch of fluid displaced.

Subsequently, as the brake pads begin to fully contact the rotors or drums and compliance is overcome, relatively high pressures, often exceeding 2000 pounds per square inch, are encountered. During this latter period of brake application, relatively lower amounts of fluid flow are required. For example, as the pressure is increased from 200 to 2000 pounds per square inch, 0.14 cubic inches of brake fluid are displaced. This equates to an average pressure increase of 128.57 psi/0.01 cubic inch of fluid displaced.

In order to meet the requirements for these two functionally different periods of brake application, a screw driver system must be capable of effecting translation of the piston in a manner that results in high fluid flow conditions under relatively low pressure while at the same time operating under lower fluid flow conditions and significantly higher pressures. One way to provide this capability is with a variable pitch screw. However this solution is difficult to achieve in high quantity applications because producing a variable pitch screw with conventionally cut threads is extremely difficult.

The present invention utilizes a variable pitch screw driver to generate the required system pressure and response times effectively and efficiently during apply and release fluid pressurization cycles for operation in applications such as vehicle braking systems. The screw driver includes a fixed-pitch base screw for basic linear piston movements. Translation of the piston effects volumetric changes in a closed loop vehicle braking system and results in fluid pressure modulation. The base screw rides in a rotatably driven nut. When a motor actuator is used to rotate the nut, the screw responds by translating in the linear direction. Simultaneously, the screw is guided by a helical member causing the screw to selectively rotate in response. The helical member optionally has a fixed pitch or variable pitch design. The helical member can be designed to result in relatively complex effective screw pitch results from the screw driver system.

Simultaneous linear translation and rotation of the base screw results in an effective variable screw pitch which is tailorable to the optimum braking system pressurization requirements. The effective screw pitch is changed by base screw rotation simultaneously with its longitudinal translation. Preferably, as the base screw translates in the linear direction, a pin carried in the base screw is rotated by the helical member and operates to result in an increase or decrease in the effective dynamic screw pitch.

As a result, the variable pitch screw driver system is adapted to provide relatively rapid linear translation of a piston when system requirements include relatively high fluid flow rate conditions. Further the system is designed to result in relatively slower linear translation of the piston as fluid flow rate conditions lessen and operating pressures increase. An additional benefit of piston backdrivability is also provided by the present invention.

DESCRIPTION OF THE PREFERRED EMBODIMENT

Figure 1:
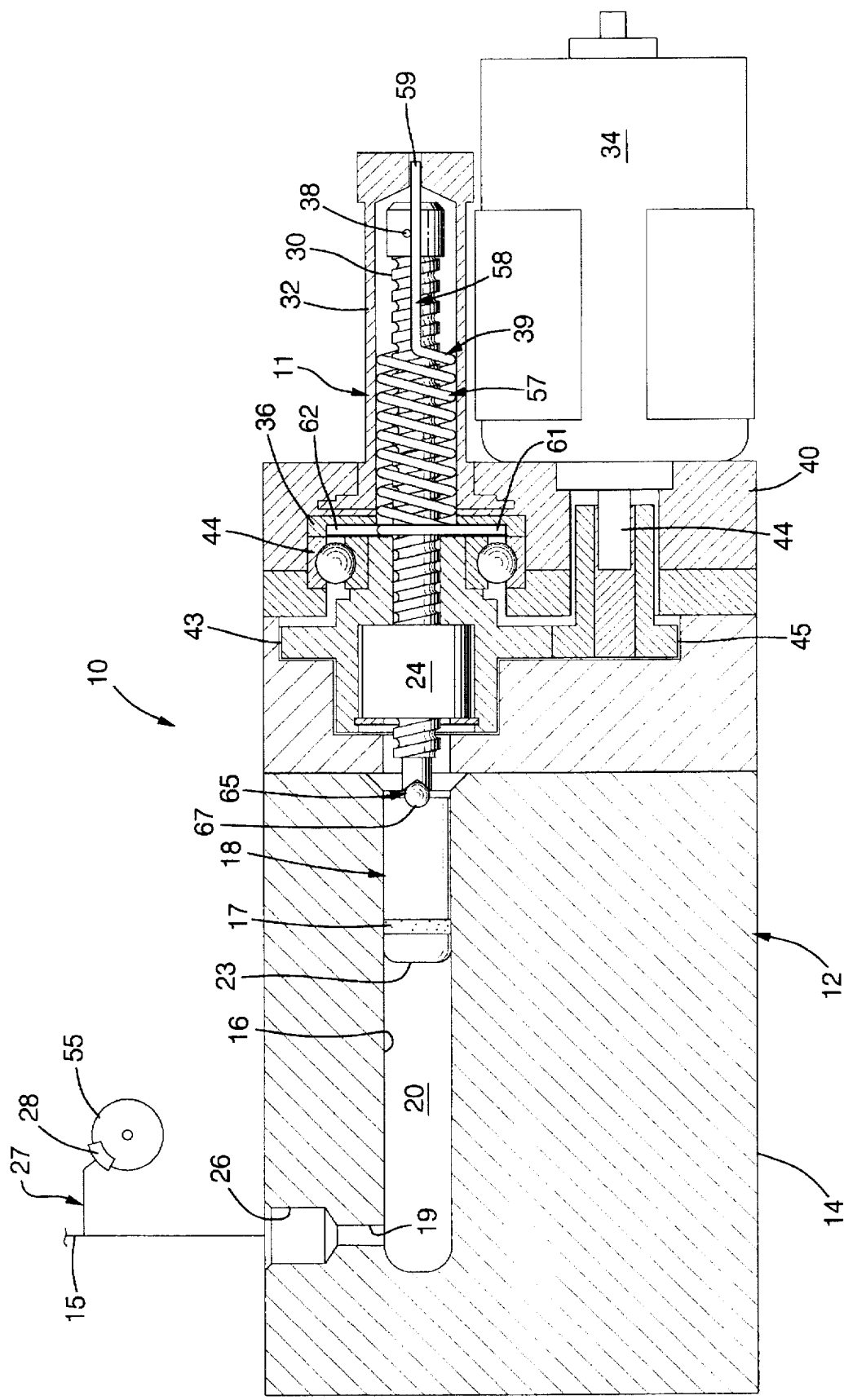
FIG. 1 is a fragmentary cross sectional illustration of a variable pitch screw driver system.

Referring to the drawings, illustrated in FIG. 1 is a variable pitch screw driver system embodied in a vehicle braking system designated in the aggregate as 10. Braking system 10 includes modulator 12 which is interconnected with a wheel brake 28 and a master cylinder (not illustrated) through the branch 15. Preferably, the master cylinder is selectively isolatable from the wheel brake 28 and modulator 12 by a controllable valve (not illustrated), in the branch 15. The modulator 12 communicates with the wheel brake 28 through port 26 and brake line 27.

The modulator 12 includes a body 14 within which longitudinal bore 16 is defined. A piston assembly 18 is slidably disposed in a longitudinal bore 16. The piston assists in defining a variable chamber 20 within the longitudinal bore 16. Piston assembly 18 carries a seal 17 to maintain fluid separation between variable chamber 20 and the remainder of longitudinal bore 16. The variable chamber 20 communicates through the bore 19, port 26 and brake line 27 with the wheel brake 28. When the master cylinder is selectively isolated from the variable chamber 20, any volumetric changes of the variable chamber 20 effected by translation of the piston assembly 18 within the longitudinal bore 16 result in a corresponding pressure increase or decrease which is communicated through the brake line 27 to the wheel brake 28. Therefore, the modulator 12, by means of linear translation of piston assembly 18, effects application action or release action of the wheel brake 28 by a selective pressure increase or decrease effected in the variable chamber 20.

Linear translation of the piston assembly 18 is provided through operation of variable pitch screw driver mechanism 11. Screw driver mechanism 11 includes a fixed-pitch threaded shaft designated as base screw 30 which carries a transverse pin 38. Base screw 30 extends from the body 14 of modulator 12 and is substantially axially centered with the longitudinal bore 16. The base screw 30 is covered by a closed tube 32 which is rigidly held by the body 14. A rotatable nut 24 is carried about base screw 30 by a geared body 43.

The geared body 43 is rotatably supported by bearing assembly 44 which is pressed into the body 14 against washer 36. A plurality of ball bearings (not illustrated), are engageably carried between the base screw 30 and the drive nut 24. Bi-directional rotation of geared body 43 and drive nut 24 is effected by motor actuator 34. The actuator 34 engages drive nut 24 through gear body 43 and the gear 45 which is fixed on rotatable shaft 44. Actuator 34 is fixed on mounting base 40 of body 14 by a conventional fastening means.

To control rotation of the base screw 30, a radial force is generated between the pin 38 and the helical member assembly 39. This occurs during the application of large forces to the top 23 of piston assembly 18 resulting from high fluid pressures in variable chamber 20. It has been found that friction between the piston assembly 18 and base screw 30 must be reduced to facilitate rotation of base screw 30 and to maintain proper contact between the pin 38 and the helical member assembly 39. Accordingly, the present embodiment includes a thrust bearing assembly 65 that is incorporated to permit relative rotation between the top 23 of the piston assembly 18 and the base screw 30 and resulting in reduced friction therebetween. The thrust bearing assembly 65 includes a single ball bearing 67 that is carried between the piston 18 and the base screw 30.

The helical member assembly 39 is designed such that in the present embodiment during initial translation of the piston assembly 18, in a direction which effects reduction of the volume of variable chamber 20 and a corresponding brake application action, the incremental translation of base screw 30 advances at a relatively high rate due to the longitudinally disposed section 58 of the helical member assembly 39. The end 59 of longitudinally disposed section 58 is rigidly supported in the tube 32.

Figure 2:
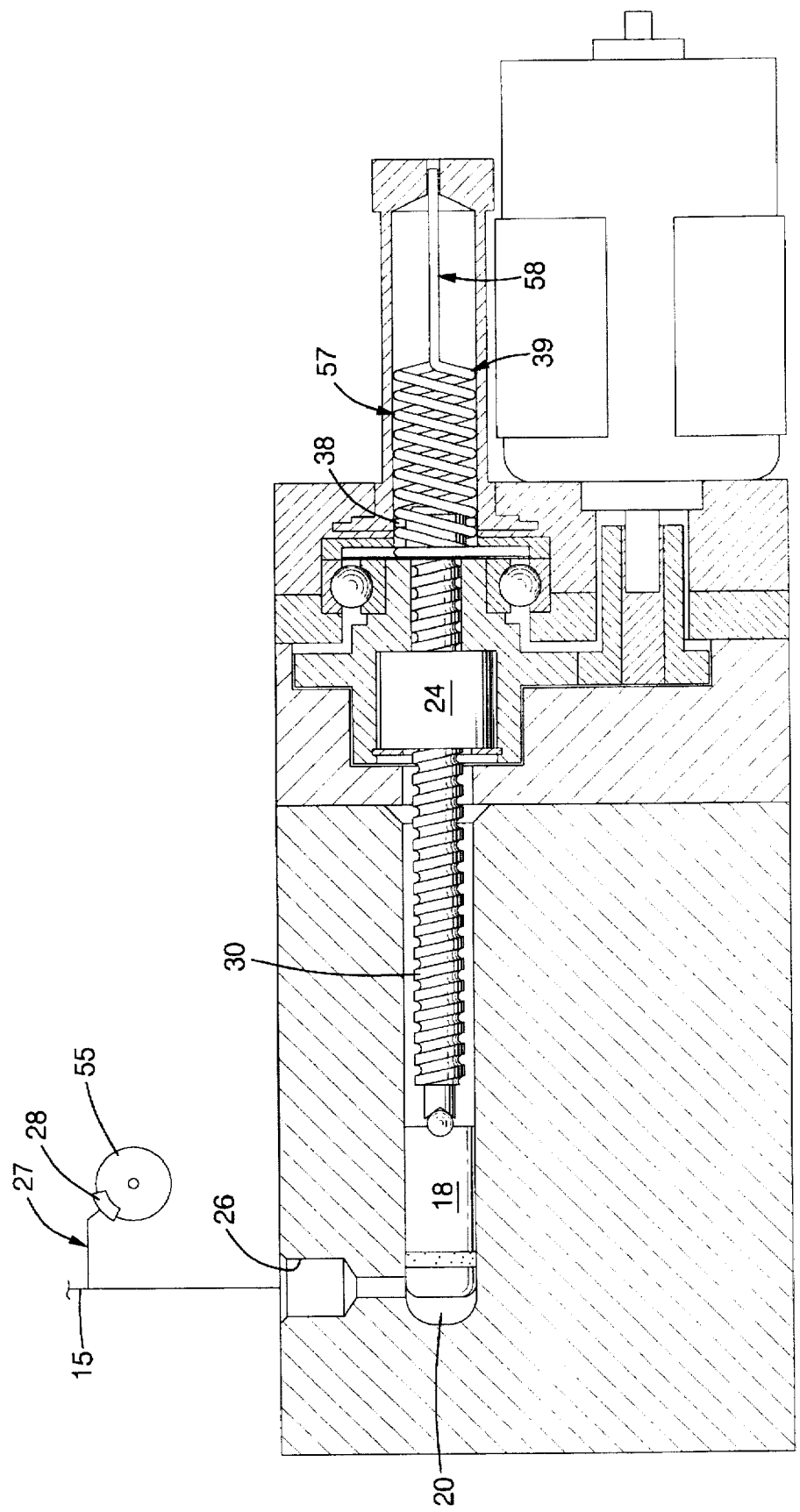
FIG. 2 is a fragmentary cross sectional illustration of the variable pitch screw driver system of FIG. 1 shown in a second position.

As linear translation of the piston assembly 18 approaches a transition point, the pin 38 enters the helical section 57 of helical member assembly 39. When the pin 38 is in the helical section 57, rotational translation of the base screw 30 in the same direction as that of the drive nut 24 is effected. This substantially reduces the linear translation rate of the piston 18 for a constant radial speed of the motor actuator 34. FIG. 2 illustrates the pin 38 in the helical section 57 of helical member assembly 39. The pin 38 is supported by the helical member assembly 39 on both sides of the base screw 30 to avoid the imposition of a cantilevered type load.

The transition from longitudinally disposed section 58 to helical section 57 is positioned to occur in correspondence with a selected point of operation of the braking system 10. The effective screw pitch that results is designed to correspond with the fact that the modulator 12 is actuating wheel brake 28 through the brake line 27. During initial pressurization of the system 10, with the associating master cylinder isolated through branch 15 from the modulator 12, the wheel brake 28 operates wherein brake pads (not illustrated) begin to contact the rotor 55. With relatively low pressure existing at this point in the brake line 27 and in variable chamber 20, relatively rapid linear translation of the piston assembly 18 is preferable. Therefore, rotation of the base screw 30 is prevented by means of the helical member assembly 39. Linear translation of the piston 18 is effected solely by rotation of the drive nut 24. Subsequently, during further pressurization of the system 10, as the brake pads come fully into contact with the rotor 55 and pressure begins to build in the braking line 27 and the variable chamber 20, flow rate is reduced as the pin 38 enters the helical section 57. Linear translation of the piston assembly 18 is effected by rotation of both the drive nut 24 and the base screw 30.

Figure 3:
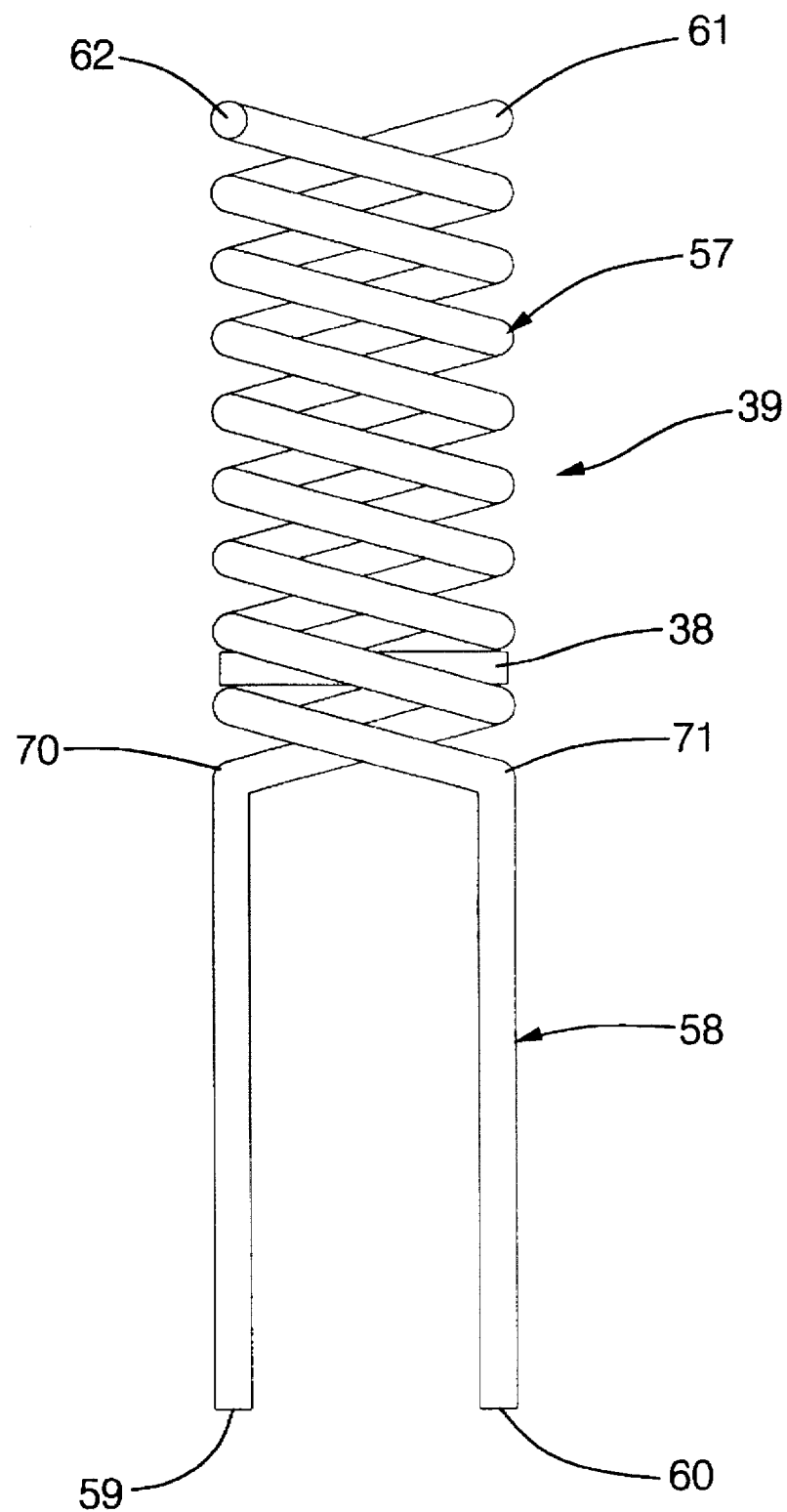
FIG. 3 is a schematic perspective illustration of the helical member of the variable pitch screw driver system of FIG. 1.

Operation of the helical member assembly 39 is more fully demonstrated by the schematic representation illustrated in FIG. 3 and therefore, reference is directed thereto. As shown in FIG. 3, the helical member assembly 39 includes two helical screws 70 and 71 wound together in an intertwined fashion. The ends 59 and 60 and the ends 61 and 62 (as seen in FIG. 1), are fixed. When the base screw 30 translates such that the pin 38 follows the longitudinally disposed section 58, the base screw does not rotate. When the pin 38 is within the helical section 57, the base screw 30 is rotated in the same direction as the rotational direction of drive nut 24 thereby, slowing linear translation of the base screw 30 and piston assembly 18. With slower translation of the piston assembly 18 corresponding with high pressure in the variable chamber 20, lower input torque is required from the motor actuator 34 than would be the case if translation continued at a constant rate.

It has been found that the use of pin 38 that extends completely through the base screw 30 engaging a pair of helical member 59 and 60 maintains a balanced force distribution laterally across the base screw 30. This ensures smooth operation of the variably driven mechanism without binds so that the piston 18 is backdrivable by fluid pressure in the chamber 20 when torque is not applied by the motor 34. By using a helical screw design, a variable pitch is more readily imparted into the device. The specific profile of the helical section 57 can be modified to effect the desired response in linear translation piston assembly 18. For example, the helical section can be wound in a continuously variable pitch to effect a continuously changing translation rate of the piston 18.

By means of the modulator 12, a variable pitch screw driver system is provided that has particularly useful application in the brake system 10. In the present embodiment, the helical member 39 is tailored to such use. The present invention is not intended to be limited to such application however, and it can be seen that the foregoing description provides details of a variable pitch screw driver system that is capable of a variety of uses.

I claim:

1. A variable pitch screw driver comprising:

a rotatable drive nut;

a base screw having a fixed pitch and extending through the drive nut;

a helical member formed in a helix and disposed about the base screw; and a pin extending from the base screw and engaging the helical member;

wherein linear translation of the base screw results from rotation of the drive nut and by a variable degree of rotation of the base screw effected by engagement of the pin with the helical member.

2. A variable pitch screw driver according to claim 1 wherein the helical member includes a helical section and a longitudinally disposed section and wherein when the pin engages the helical member in the longitudinal section, rotation of the base screw is substantially prevented during linear translation of the base screw.

3. A variable screw driver according to claim 2 wherein the helical member includes two intertwined helically wound members.

4. A variable screw driver comprising;

a body having a bore;

a piston slidably disposed in the bore defining a variable chamber;

a bearing engaging the piston;

a base screw having a fixed pitch engaging the bearing so that the base screw is rotatable relative to the piston;

a pin extending laterally from the base screw;

a rotatable drive nut disposed about and engaging the base screw wherein the drive nut is fixed against longitudinal translation; and a helical member assembly including a pair of helical members each having a helical section and a longitudinally disposed section wherein the helical sections of the pair of helical members are intertwined and disposed about the base screw;

wherein the base screw is translatable in a longitudinal direction in response to rotation of the drive nut at a first constant rate of translation when the pin engages the longitudinally disposed section of the helical member assembly holding the base screw against rotation and at a second rate of translation when the pin engages the helical section of the helical member assembly effecting rotation of the base screw during translation in the longitudinal direction.

5. A variable pitch screw driver system comprising:

a body having a bore and a port opening to the bore;

a brake line communicating with the port;

a wheel brake connected to the brake line;

a piston slidably disposed in the bore defining a variable chamber for selectively pressurizing the brake line to actuate the wheel brake;

a bearing engaging the piston;

a base screw having a fixed pitch engaging the bearing so that the base screw is rotatable relative to the piston;

a pin extending laterally from the base screw;

a rotatable drive nut disposed about and engaging the base screw wherein the drive nut is fixed against longitudinal translation; and a helical member assembly including a pair of helical members each having a helical section and a longitudinally disposed section wherein the helical sections of the pair of helical members are intertwined and disposed about the base screw;

wherein the base screw is translatable in a longitudinal direction in response to rotation of the drive nut at a first constant rate of translation when the pin engages the longitudinally disposed section of the helical member assembly holding the base screw against rotation resulting in a first rate of pressurization of the brake line, and at a second rate of translation when the pin engages the helical section of the helical member assembly effecting rotation of the base screw during translation in the longitudinal direction resulting in a second rate of pressurization of the brake line.

6. A variable pitch screw driver system according to claim 5 further comprising a motor actuator engaging the rotatable drive nut through a gear assembly to provide a drive torque to the rotatable drive nut and wherein the pin extends laterally from the base screw and simultaneously engages both helical members of the helical member assembly so that the piston is backdrivable with the pin being driven through the helical section by a fluid pressure in the variable chamber when the drive torque is absent.

* * * * *